(12) United States Patent
Xu et al.

(10) Patent No.: US 11,556,197 B1
(45) Date of Patent: Jan. 17, 2023

(54) TOUCH PANEL AND METHOD OF MANUFACTURING THE SAME

(71) Applicant: TPK Advanced Solutions Inc., Fujian (CN)

(72) Inventors: Liang Zhen Xu, Xiamen (CN); Yu Zhang, Xiamen (CN); Fei Zhen Wu, Xiamen (CN); Chao Gao, Xiamen (CN); Yi Zhong Lin, Quanzhou (CN)

(73) Assignee: TPK Advanced Solutions Inc., Fujian (CN)

( * ) Notice: Subject to any disclaimer, the term of this patent is extended or adjusted under 35 U.S.C. 154(b) by 0 days.

(21) Appl. No.: 17/513,177

(22) Filed: Oct. 28, 2021

(51) Int. Cl.
  *G06F 3/041* (2006.01)
  *G06F 3/044* (2006.01)
  *G06F 3/045* (2006.01)
(52) U.S. Cl.
  CPC ............ *G06F 3/0412* (2013.01); *G06F 3/045* (2013.01); *G06F 3/0445* (2019.05); *G06F 2203/04103* (2013.01); *G06F 2203/04112* (2013.01)
(58) Field of Classification Search
  CPC ...... G06F 3/0412; G06F 3/0445; G06F 3/045; G06F 2203/04103; G06F 2203/04112
  See application file for complete search history.

(56) References Cited

U.S. PATENT DOCUMENTS

| 2014/0354901 A1* | 12/2014 | Zhao | G06F 3/0445 |
| | | | 349/12 |
| 2016/0216821 A1* | 7/2016 | Lee | G06F 3/041 |
| 2019/0383973 A1* | 12/2019 | Jang | G06F 1/1652 |

\* cited by examiner

*Primary Examiner* — Md Saiful A Siddiqui
(74) *Attorney, Agent, or Firm* — Cooper Legal Group, LLC

(57) ABSTRACT

A touch panel includes a thin-film substrate, a first conductive layer, and a second conductive layer. The thin-film substrate has a display region and a peripheral region defined thereon, has a first surface and a second surface opposite to each other, and has a thickness. The first conductive layer is disposed on the first surface and includes a plurality of first traces disposed in the peripheral region. The second conductive layer is disposed on the second surface and includes a plurality of second traces disposed in the peripheral region. The thin-film substrate has at least one groove at an interlaced region between one of the first traces and one of the second traces. The groove is in one of the first surface or the second surface and has a depth. The depth is between about 2.5 μm and about one-half of the thickness.

12 Claims, 7 Drawing Sheets

TOUCH PANEL AND METHOD OF MANUFACTURING THE SAME

BACKGROUND

Technical Field

The present disclosure relates to a touch panel and a method of manufacturing the same.

Description of Related Art

With the diversified development of touch modules, touch modules have been maturely applied to industrial electronics and consumer electronics products. Touch products that combine various applications on medium and large size products will become more and more common.

One of the current mainstream capacitive touch technologies is the film type touch panel. The film type touch panel is made by fabricating the touch layer (such as indium tin oxide (ITO)) on two films, and the outer side is protected by adding a cover plate (such as glass), so the film type touch panel is also called a GFF (Glass-Film-Film) structure. However, the touch display device adopting the aforementioned GFF structure requires a total of three optical clear adhesive (OCA) layers, so there are problems such as optical difference and high cost. In response to the rapid production needs of the next generation of ultra-thin film touch, how to introduce a fast patterning process for ultra-thin film touch is more important.

Accordingly, how to provide a touch panel and a method of manufacturing the same to solve the aforementioned problems becomes an important issue to be solved by those in the industry.

SUMMARY

An aspect of the disclosure is to provide a touch panel and a method of manufacturing the same that can efficiently solve the aforementioned problems.

According to an embodiment of the disclosure, a touch panel includes a thin-film substrate, a first conductive layer, and a second conductive layer. The thin-film substrate has a display region and a peripheral region defined thereon, the thin-film substrate has a first surface and a second surface opposite to each other, and the thin-film substrate has a thickness. The first conductive layer is disposed on the first surface and includes a plurality of first traces disposed in the peripheral region. The second conductive layer is disposed on the second surface and includes a plurality of second traces disposed in the peripheral region. The thin-film substrate has at least one groove at an interlaced region between one of the first traces and one of the second traces. The groove is in one of the first surface or the second surface and has a depth. The depth is between 2.5 µm and one-half of the thickness.

In an embodiment of the disclosure, the first traces include a plurality of pin structures and a ground line. The one of the first traces is the ground line.

In an embodiment of the disclosure, the groove is located on the first surface and aligned with an edge of the ground line in a direction perpendicular to the first surface.

In an embodiment of the disclosure, the groove and the ground line are misaligned in the direction perpendicular to the first surface.

In an embodiment of the disclosure, the first conductive layer further includes a first metal layer and a first electrode layer. The first electrode layer and the first metal layer are sequentially stacked on the first surface and form the first traces together in the peripheral region. The second conductive layer further includes a second metal layer and a second electrode layer. The second electrode layer and the second metal layer are sequentially stacked on the second surface and form the second traces together in the peripheral region.

In an embodiment of the disclosure, the first electrode layer includes a plurality of first-axis electrodes in the display region. The second electrode layer includes a plurality of second-axis electrodes in the display region.

In an embodiment of the disclosure, at least one of the first electrode layer or the second electrode layer is a silver nanowire electrode layer.

In an embodiment of the disclosure, the groove is located on the first surface. A gap is formed between adjacent two of the first traces. The groove and the gap are aligned with each other in a direction perpendicular to the first surface.

In an embodiment of the disclosure, the groove is located on the second surface. A gap is formed between adjacent two of the second traces. The groove and the gap are aligned with each other in a direction perpendicular to the second surface.

In an embodiment of the disclosure, the groove is located on the second surface and aligned with an edge of the one of the second traces in a direction perpendicular to the second surface.

In an embodiment of the disclosure, the thickness of the thin-film substrate is between 12.5 µm and 125 µm.

In an embodiment of the disclosure, the touch panel further includes a protective layer covering the first traces.

In an embodiment of the disclosure, the protective layer is frame-shaped and covers a side of the first traces away from the thin-film substrate and an inner edge of the first traces.

According to an embodiment of the disclosure, a method of manufacturing a touch panel includes: forming a first conductive layer on a first surface of a thin-film substrate, in which the thin-film substrate has a thickness, and the thin-film substrate has a display region and a peripheral region defined thereon; and performing a laser etching process to the first conductive layer to form a plurality of first traces in the peripheral region and form at least one groove with a depth on the first surface, in which the depth is between 2.5 µm and one-half of the thickness.

In an embodiment of the disclosure, the forming the first conductive layer on the first surface of the thin-film substrate includes: forming a first electrode layer on the first surface of the thin-film substrate in the display region; and forming a first metal layer on the first electrode layer. The performing the laser etching process to the first conductive layer etches the first metal layer and the first electrode layer, such that the first metal layer and the first electrode layer jointly form the first traces in the peripheral region.

In an embodiment of the disclosure, the method further includes: forming a second conductive layer on a second surface of the thin-film substrate, in which the first surface and the second surface are respectively located at opposite two sides of thin-film substrate; and performing the laser etching process to the second conductive layer to form a plurality of second traces in the peripheral region.

In an embodiment of the disclosure, the performing the laser etching process to the second conductive layer is performed later than the performing the laser etching process to the first conductive layer, and the performing the laser etching process to the second conductive layer increases a resistance value of the first traces within 5%.

In an embodiment of the disclosure, the performing the laser etching process to the first conductive layer is performed later than the performing the laser etching process to the second conductive layer, and the performing the laser etching process to the first conductive layer increases a resistance value of the second traces within 5%.

In an embodiment of the disclosure, the forming the second conductive layer on the second surface of the thin-film substrate includes: forming a second electrode layer on the second surface of the thin-film substrate in the display region; and forming a second metal layer on the second electrode layer. The performing the laser etching process to the second conductive layer etches the second metal layer and the second electrode layer, such that the second metal layer and the second electrode layer jointly form the second traces in the peripheral region.

In an embodiment of the disclosure, the groove is located at an interlaced region of the thin-film substrate between one of the first traces and one of the second traces.

Accordingly, in the touch panel of the present disclosure, the two conductive layers are respectively disposed on the opposite two surfaces of the thin-film substrate, and electrodes and traces are respectively formed in the display region and the peripheral region by double-sided laser etching. Therefore, compared with the conventional GFF structure, the touch panel disclosed in the present disclosure includes one less optical clear adhesive (OCA) layer and one substrate, so that the cost can be saved. In addition, the present disclosure effectively utilizes laser etching to clean the trace patterns in the peripheral region on the thin-film substrate, so as to form the traces without short circuits. At the same time, the present disclosure has excellent laser control technology to form shallow trenches on the thin-film substrate. Even if the thin-film substrate absorbs energy, the relationship between the depth of the grooves and the thickness of the thin-film substrate is controlled to ensure that the mechanical structure of the film substrate is not affected. The depth control technology of the present disclosure depends on the fact that the laser process of the present disclosure can effectively control the mathematical relationship between the depth of the grooves and the thickness of the thin-film substrate (that is, $D<\frac{1}{2}T$ hereinafter) to ensure that the thin-film substrate retains sufficient mechanical structure. Moreover, the present disclosure teaches the technical idea of adjusting the depth of the grooves according to the thickness of the thin-film substrate, which provides a breakthrough in mass production of ultra-thin double-sided fast laser manufacturing process.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1A:
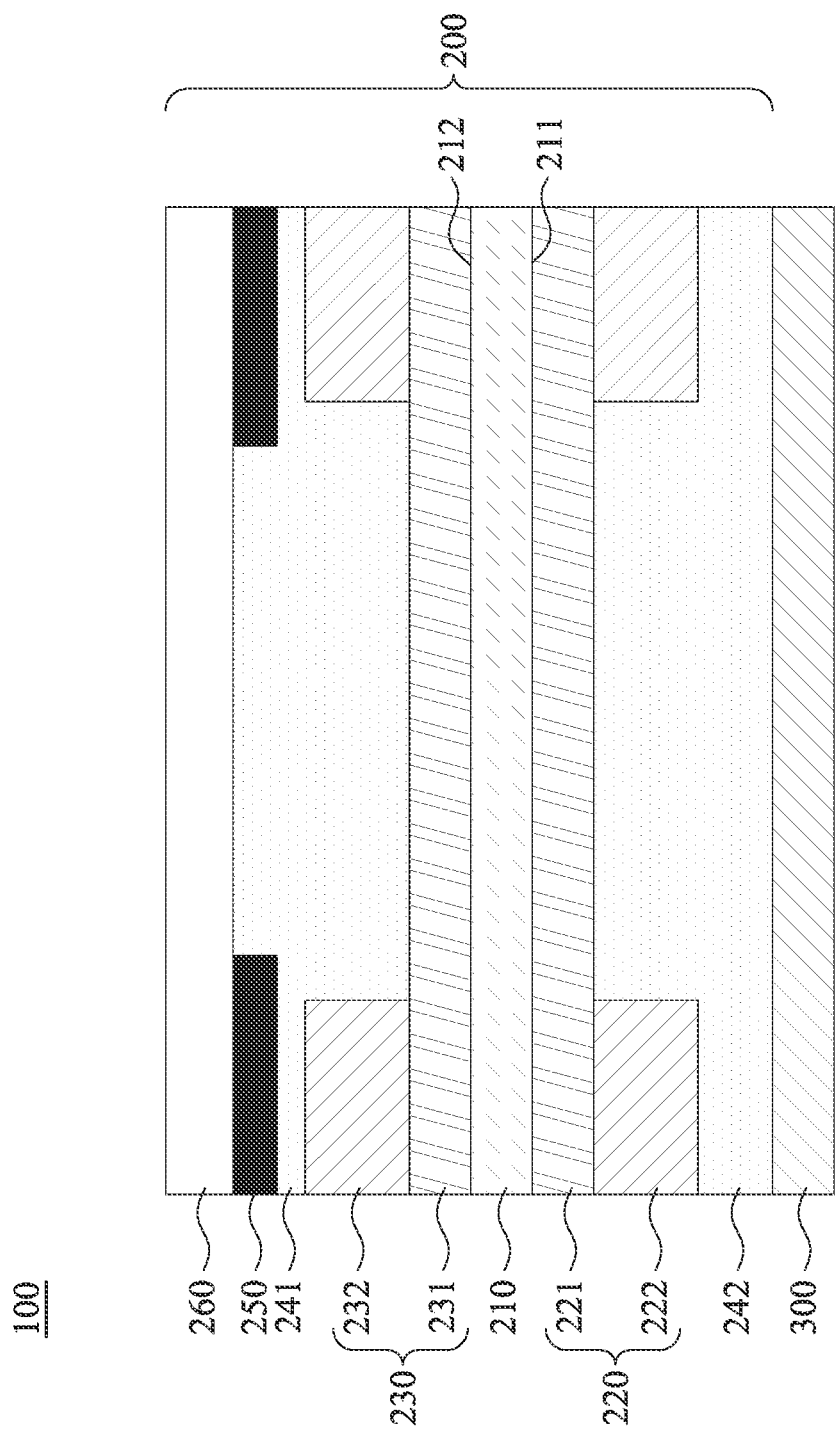
FIG. 1A is a schematic diagram of an electronic device according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1A. FIG. 1A is a schematic diagram of an electronic device 100 according to an embodiment of the present disclosure. As shown in FIG. 1A, in the present embodiment, the electronic device 100 includes a touch panel 200 and a display 300. The touch panel 200 is disposed on the display 300. The touch panel 200 includes a thin-film substrate 210, a first conductive layer 220, a second conductive layer 230, adhesive layers 241, 242, a light-shielding layer 250, and a cover plate 260. The thin-film substrate 210 has a first surface 211 and a second surface 212 opposite to each other. The first conductive layer 220 is disposed on and in contact with the first surface 211. The second conductive layer 230 is disposed on and in contact with the second surface 212. The cover plate 260 is adhered to a side of the second conductive layer 230 away from the thin-film substrate 210 through the adhesive layer 241. The display 300 is adhered to a side of the first conductive layer 220 away from the thin-film substrate 210 through the adhesive layer 242. The light-shielding layer 250 is disposed between the cover plate 260 and the second conductive layer 230.

In some embodiments, the material of the thin-film substrate 210 includes Polyethylene terephthalate (PET), but the disclosure is not limited in this regard.

In some embodiments, the material of the cover plate 260 includes glass, but the disclosure is not limited in this regard.

In some embodiments, at least one of the adhesive layers 241, 242 may be an optical clear adhesive (OCA) layer, but the disclosure is not limited in this regard.

With the aforementioned structural configurations, compared with a conventional GFF structure, the touch panel 200 of the present embodiment can be reduced by one OCA layer and one substrate, so that the cost can be saved. In addition, the present disclosure may use an ultra-thin thin-film substrate 210 so that the overall thickness can be extremely small.

Figure 1B:
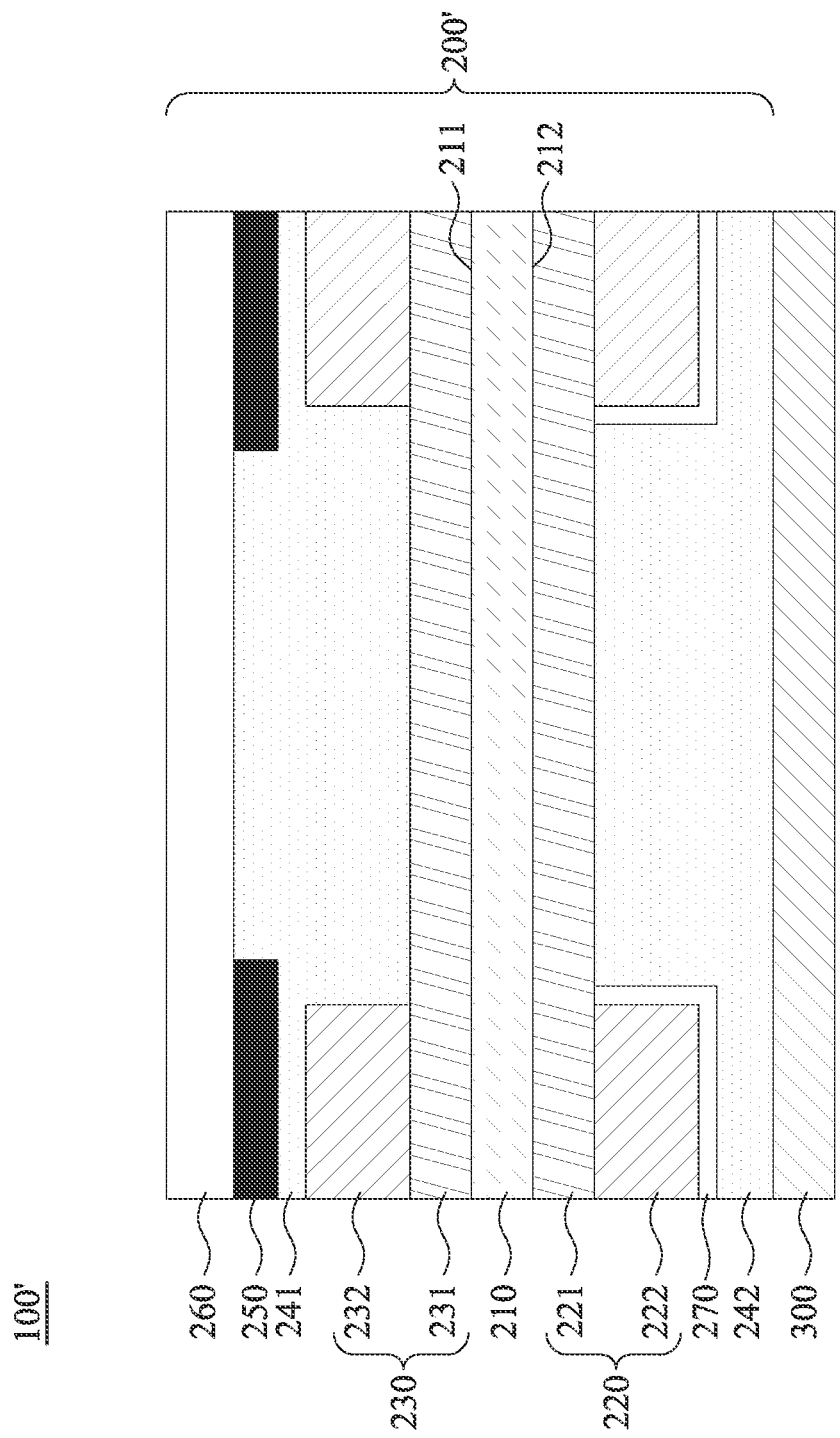
FIG. 1B is a schematic diagram of an electronic device according to another embodiment of the present disclosure.
Figure 2:
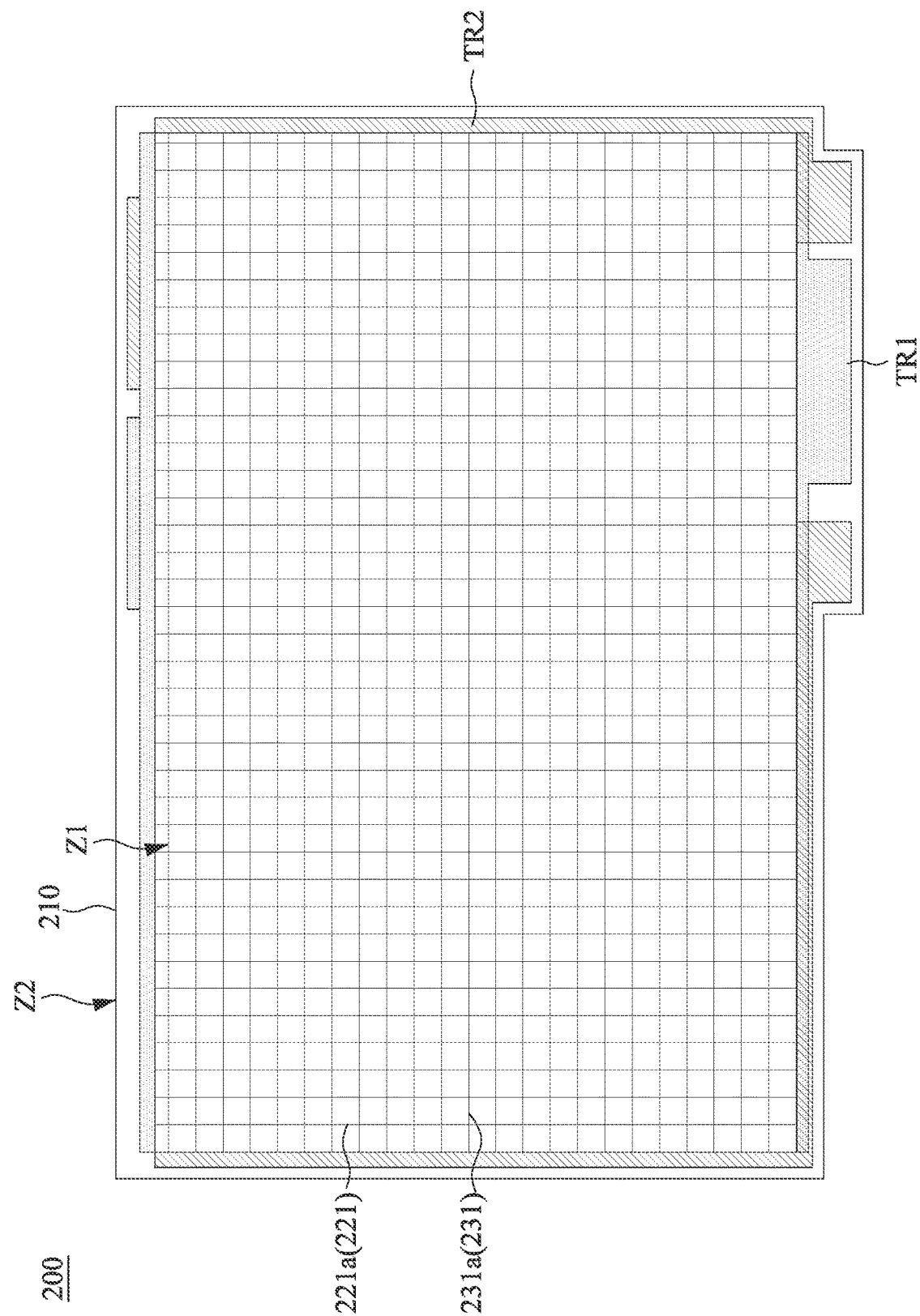
FIG. 2 is a front view of some components of a touch panel in FIG. 1A.
Figure 3:
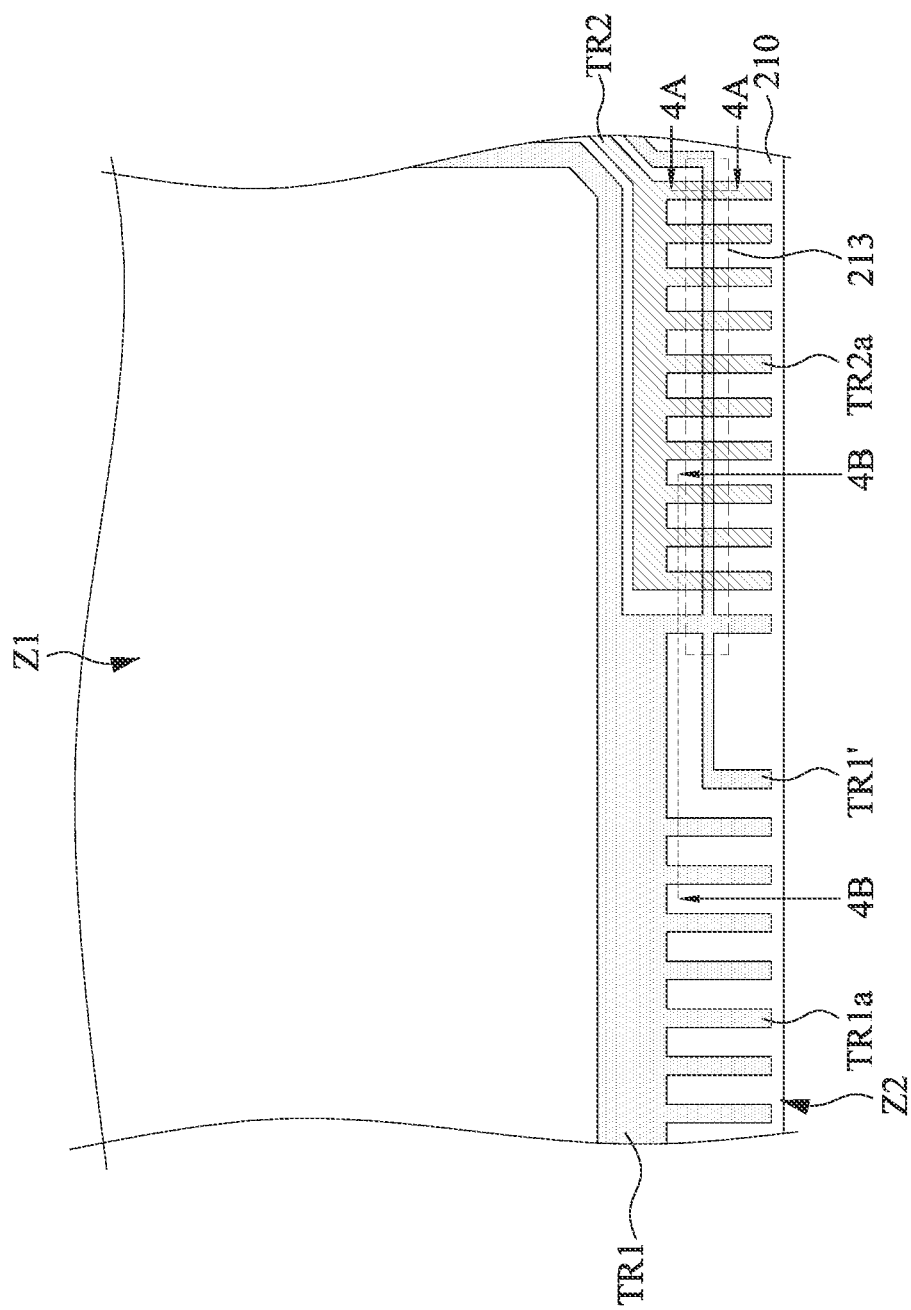
FIG. 3 is a partial enlarged view of the touch panel in FIG. 2.

Reference is made to FIG. 2 and FIG. 3. FIG. 2 is a front view of some components of the touch panel 200 in FIG. 1A. FIG. 3 is a partial enlarged view of the touch panel 200 in FIG. 2. As shown in FIGS. 1A to 3, in the present embodiment, the thin-film substrate 210 has a display region Z1 and a peripheral region Z2 defined thereon. The first conductive layer 220 includes a first electrode layer 221 and a first metal layer 222. The first electrode layer 221 is disposed in the display region Z1. The first electrode layer 221 and the first metal layer 222 are sequentially stacked on the first surface 211 and jointly form a plurality of first traces TR1 in the peripheral region Z2. The second conductive layer 230 includes a second electrode layer 231 and a second metal layer 232. The second electrode layer 231 is disposed in the display region Z1. The second electrode layer 231 and the second metal layer 232 are sequentially stacked on the second surface 212 and jointly form a plurality of second traces TR2 in the peripheral region Z2. The light-shielding layer 250 is located in the peripheral region Z2, and is configured to shield the first traces TR1 and the second traces TR2 from above.

In detail, the first electrode layer 221 includes a plurality of first-axis electrodes 221a. The second conductive layer 230 includes a plurality of second-axis electrodes 231a. The aforementioned "first-axis" and "second-axis" respectively are, for example, two axes (for example, the Y axis and the X axis) that are perpendicular to each other. In other words, the first-axis electrodes 221a are conductive lines extending along the first axis and arranged at intervals. The second-axis electrodes 231a are conductive lines extending along the second axis and arranged at intervals. In addition, the first traces TR1 include a plurality of pin structures TR1a, and the second traces TR2 include a plurality of pin structures TR2a. The pin structures TR1a and TR2a are located at the same edge of the thin-film substrate 210 and are configured to be connected to a flexible circuit board (not shown). Hence, the touch signals generated by the touch panel 200 can be transmitted from the first electrode layer 221 and the second electrode layer 231 to the flexible circuit board respectively through the first traces TR1 and the second traces TR2.

In some embodiments, at least one of the first electrode layer 221 or the second electrode layer 231 may be a silver nanowire (SNW; also known as AgNW) electrode layer, but the disclosure is not limited in this regard. The at least one of the first electrode layer 221 or the second electrode layer 231 may include a substrate and silver nanowires doped therein. The silver nanowires overlap each other in the substrate to form a conductive network. The substrate refers to a non-nanosilver material formed by a solution containing the silver nanowires through processes such as coating, heating, and drying. The silver nanowires are distributed or embedded in the substrate and partially protrude out from the substrate. The substrate can protect the silver nanowires from the external environment, such as from corrosion and abrasion. In some embodiments, the substrate is compressible.

Reference is made to FIG. 1B. FIG. 1B is a schematic diagram of an electronic device 100' according to another embodiment of the present disclosure. Compared with the embodiment shown in FIG. 1A, the electronic device 100' of the present embodiment further includes a protective layer 270. The protective layer 270 covers the first traces TR1. Specifically, the protective layer 270 is frame-shaped and covers a side of the first traces TR1 away from the thin-film substrate 210 and an inner edge of the first traces TR1. The first traces TR1 and the adhesive layer 242 are separated from each other by the protective layer 270. When the peripheral region of the display 300 is smaller than the peripheral region Z2 defined on the thin-film substrate 210, the first traces TR1 will be exposed to the outside of the display 300 and potentially exposed to the environment, such as moisture. Therefore, the first traces TR1 close to the display 300 need to use the protective layer 270 to avoid the above-mentioned problems.

Figure 4A:
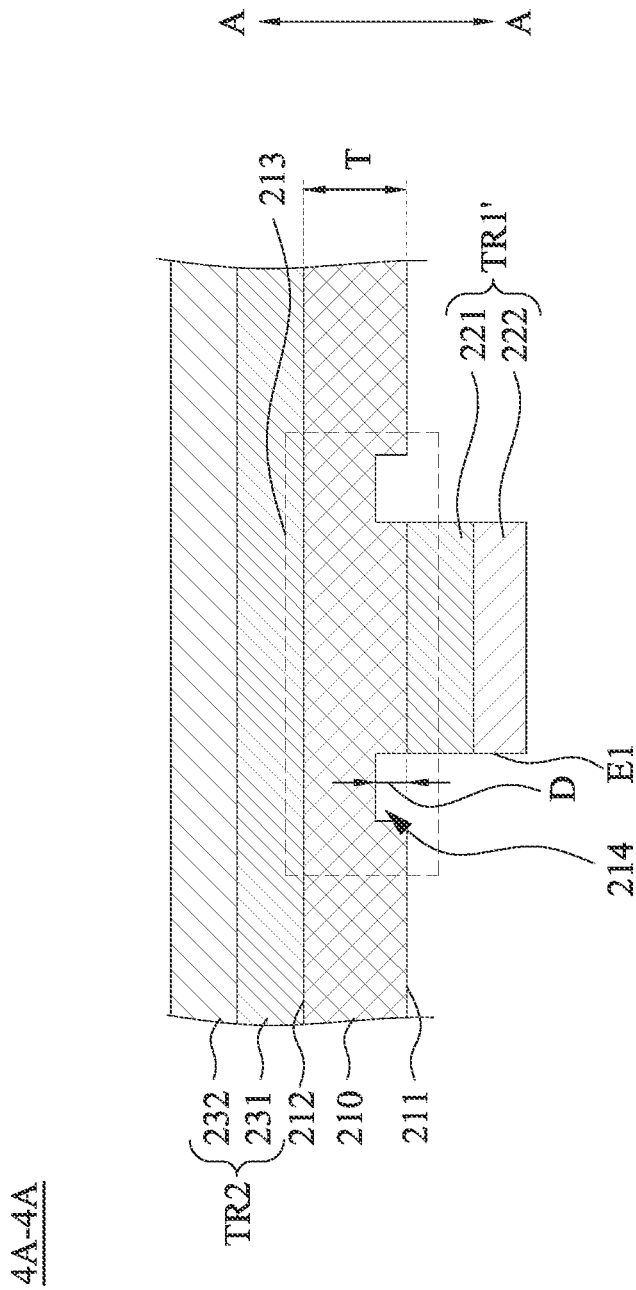
FIG. 4A is a partial cross-sectional view of the touch panel in FIG. 3 taken along line 4A-4A.
Figure 4B:
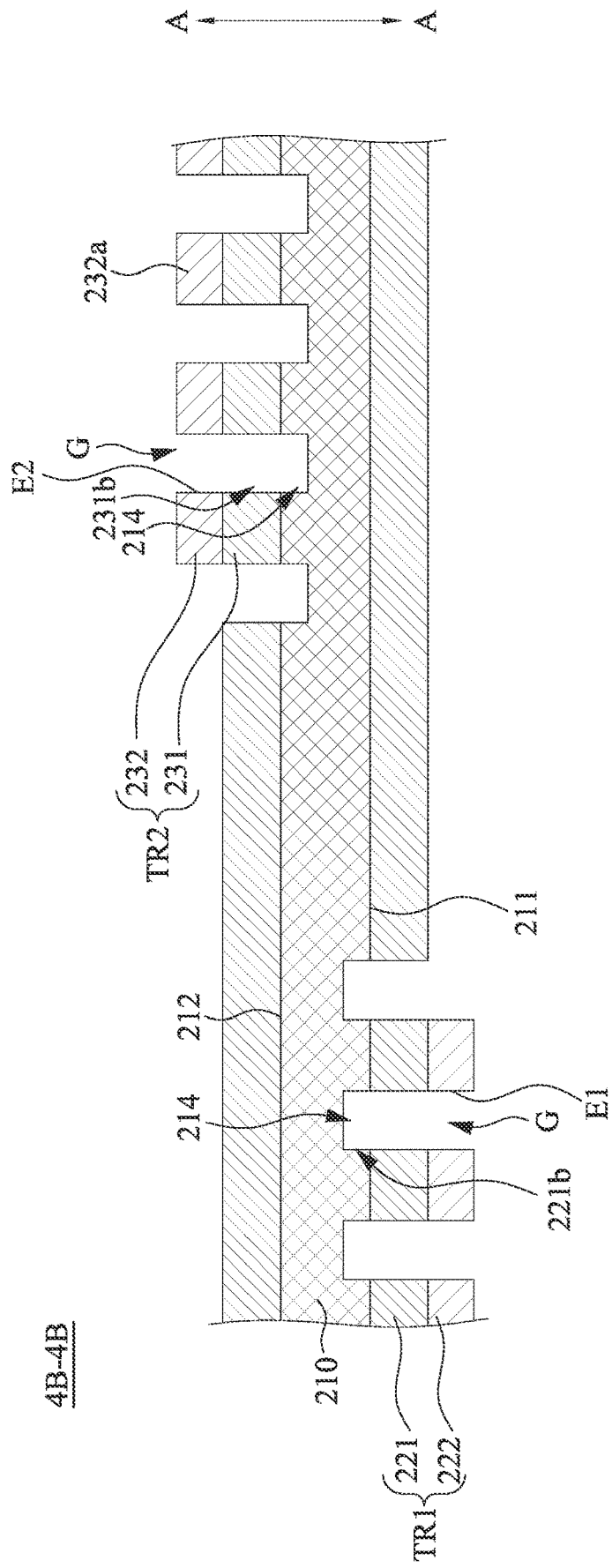
FIG. 4B is a partial cross-sectional view of the touch panel in FIG. 3 taken along line 4B-4B.

Reference is made to FIG. 4A and FIG. 4B. FIG. 4A is a partial cross-sectional view of the touch panel 200 in FIG. 3 taken along line 4A-4A. FIG. 4B is a partial cross-sectional view of the touch panel 200 in FIG. 3 taken along line 4B-4B. As shown in FIG. 4A and FIG. 4B, in the present embodiment, the thin-film substrate 210 has a plurality of grooves 214. The grooves 214 are distributed on the first surface 211 and the second surface 212. It should be noted that the thin-film substrate 210 has an interlaced region 213 between the first traces TR1 and the second traces TR2. For example, the interlaced region 213 is a region of the thin-film substrate 210 overlapped by the projections of the first traces TR1 and the second traces TR2 in a direction A (i.e., the vertical projection direction) perpendicular to the first surface 211 or the second surface 212 and an adjacent region. A groove 214 is located at least in this interlaced region 213.

As shown in FIG. 3 and FIG. 4A, in the present embodiment, the first traces TR1 further include at least one ground line TR1'. One of the grooves 214 is located on the first surface 211 and is aligned with an edge E1 of the ground line TR1' in the direction A perpendicular to the first surface 211. The groove 214 and the ground line TR1' are misaligned in the direction A perpendicular to the first surface 211. The groove 214 has a depth D. The depth D is between about 2.5 μm and about one-half of a thickness T. As shown in FIG. 3, the interlaced region 213 is a region of the thin-film substrate 210 overlapped by the projections of the ground line TR1' and the second traces TR2 in the direction A (i.e., the vertical projection direction) perpendicular to the first surface 211 or the second surface 212 and an adjacent region.

As shown in FIG. 4B, in the present embodiment, a gap G is formed between adjacent two of the first traces TR1. One of the grooves 214 is located on the first surface 211 and is aligned with an edge E1 of one of the first traces TR1 in the direction A perpendicular to the first surface 211. The first electrode layer 221 has through vias 221b connected between the grooves 214 and the gaps G. The depths D of these grooves 214 all meet the aforementioned size limit.

Identically or similarly, a gap G is formed between adjacent two of the second traces TR2. One of the grooves 214 is located on the second surface 212 and is aligned with an edge E2 of one of the second traces TR2 in the direction A perpendicular to the second surface 212. The second electrode layer 231 has through vias 231b connected between the grooves 214 and the gaps G. The depths D of these grooves 214 all meet the aforementioned size limit.

In practical applications, in the touch panel 200 of the present embodiment, the electrodes and traces may be formed in the display region Z1 and the peripheral region Z2 by double-sided laser etching. In addition, in order to cleanly etch the first traces TR1 and the second traces TR2 (since the first traces TR1 are substantially formed by stacking the first electrode layer 221 and the first metal layer 222, and the second traces TR2 are substantially formed by stacking the second electrode layer 231 and the second metal layer 232), the aforementioned laser etching uses stronger energy to cleanly etch and simultaneously form the grooves 214 (caused by absorbing laser energy) on the thin-film substrate 210, so that the manufacturing time can be effectively reduced.

It should be noted that the limitation that the depth D does not exceed one-half of the thickness T is to avoid the problem that the thin-film substrate 210 is not sufficiently supported by the mechanical structure and breaks because the grooves 214 respectively located on the first surface 211 and the second surface 212 are in the direction A. This depth control technology depends on the fact that the laser process of the present disclosure can effectively control the mathematical relationship between the depth D of the grooves 214 and the thickness T of the thin-film substrate 210 (i.e., $D<\frac{1}{2}T$), so as to ensure that the thin-film substrate 210 maintains a sufficient mechanical structure. Moreover, the present disclosure teaches the technical idea of adjusting the depth D of the grooves 214 according to the thickness T of the thin-film substrate 210, which provides a breakthrough in mass production of ultra-thin double-sided fast laser manufacturing process.

With the aforementioned structural configurations, the touch panel 200 of the present embodiment may utilize the grooves 214 to effectively increase the difficulty of short-circuiting between the traces. Not only that, the grooves 214 may also increase the flexibility of the thin-film substrate 210, thereby increasing the service life.

In some embodiments, the thickness T of the thin-film substrate 210 is between about 12.5 µm and about 125 µm, but the disclosure is not limited in this regard.

Figure 5:
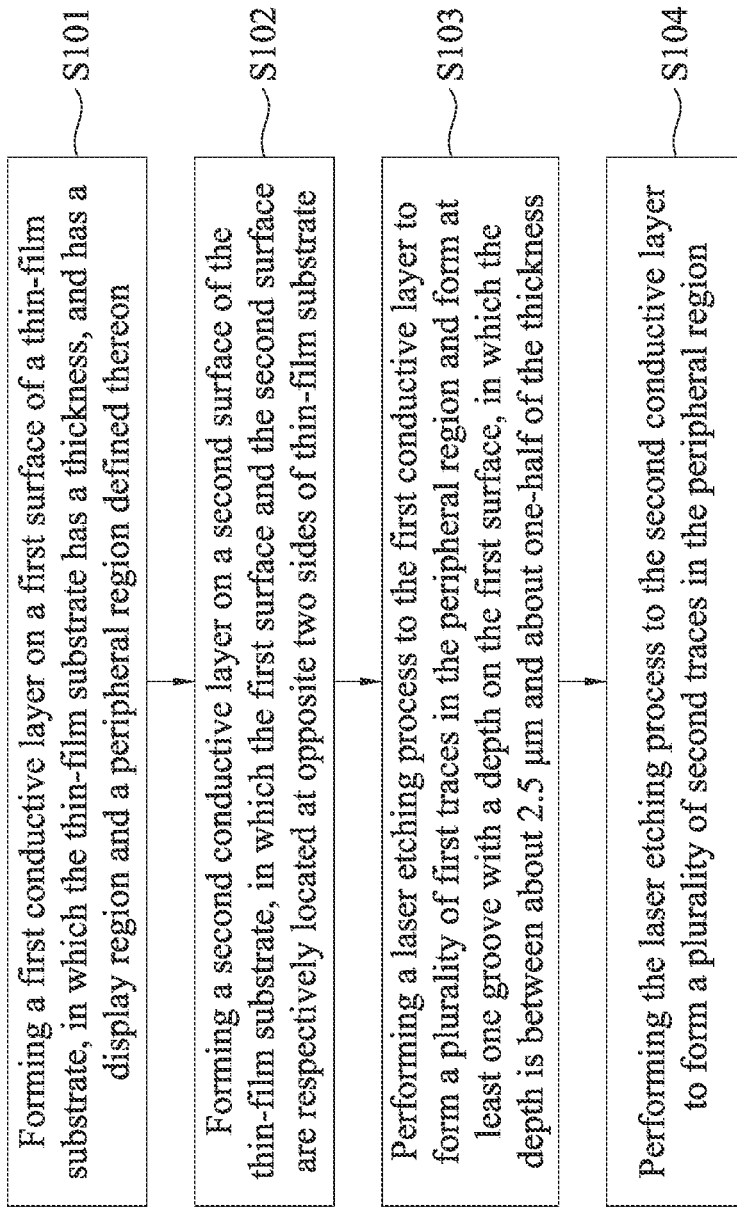
FIG. 5 is a flowchart of a method of manufacturing a touch panel according to an embodiment of the present disclosure.

Reference is made to FIG. 5. FIG. 5 is a flowchart of a method of manufacturing a touch panel according to an embodiment of the present disclosure. The method of the present embodiment includes at least step S101 to step S104. The following description is made with reference to FIGS. 1A to 4B.

Step S101: forming a first conductive layer 220 on a first surface 211 of a thin-film substrate 210, in which the thin-film substrate 210 has a thickness T and has a display region Z1 and a peripheral region Z2 defined thereon.

Step S102: forming a second conductive layer 230 on a second surface 212 of the thin-film substrate 210, in which the first surface 211 and the second surface 212 are respectively located at opposite two sides of thin-film substrate 210.

Step S103: performing a laser etching process to the first conductive layer 220 to form a plurality of first traces TR1 in the peripheral region Z2 and form at least one groove 214 with a depth D on the first surface 211, in which the depth D is between about 2.5 µm and about one-half of the thickness T.

In some embodiments, step S101 includes: forming a first electrode layer 221 on the first surface 211 of the thin-film substrate 210 in the display region Z1; and forming a first metal layer 222 on the first electrode layer 221. Moreover, step S103 etches the first metal layer 222 and the first electrode layer 221, such that the first metal layer 222 and the first electrode layer 221 jointly form the first traces TR1 in the peripheral region Z2.

Step S104: performing the laser etching process to the second conductive layer 230 to form a plurality of second traces TR2 in the peripheral region Z2.

In some embodiments, step S102 includes: forming a second electrode layer 231 on the second surface 212 of the thin-film substrate 210 in the display region Z1; and forming a second metal layer 232 on the second electrode layer 231. Moreover, step S104 etches the second metal layer 232 and the second electrode layer 231, such that the second metal layer 232 and the second electrode layer 231 jointly form the second traces TR2 in the peripheral region Z2.

In the present embodiment, step S104 is performed later than step S103, and step S104 increases a resistance value of the first conductive layer 220 within about 5%.

In some other embodiments, step S103 is performed later than step S104, and step S103 increases a resistance value of the second conductive layer 230 within about 5%.

The following table is a table of various embodiments of manufacturing the touch panel 200 by using different types of lasers.

| Region | Laser type | Groove depth | Change rate of resistance | Result |
| --- | --- | --- | --- | --- |
| First and second traces overlap (peripheral region) | IR nanosecond | 0 | Infinity | Fail |
| | IR picosecond | >5 µm | <5% | Pass |
| | UV picosecond | >10 µm | <5% | Pass |
| First and second traces do not overlap (peripheral area) | IR nanosecond | 0 | N/A | Pass |
| | IR picosecond | >5 µm | N/A | Pass |
| | UV picosecond | >10 µm | N/A | Pass |
| Display region | IR nanosecond | 0 | >5% | Fail |
| | IR picosecond | >5 µm | >5% | Fail |
| | UV picosecond | 0 | <5% | Pass |

It can be seen from the above table that for different regions of the touch panel 200, the infrared (IR) nanosecond laser, the IR picosecond laser, and the ultraviolet (UV) picosecond laser can be flexibly selected for processing. Among them, the UV picosecond laser can be used in all regions of the touch panel 200, so it is not necessary to change the laser head when the UV picosecond laser is used to manufacture the touch panel 200, and thus the manufacturing time can be reduced.

According to the foregoing recitations of the embodiments of the disclosure, it can be seen that in the touch panel of the present disclosure, the two conductive layers are respectively disposed on the opposite two surfaces of the thin-film substrate, and electrodes and traces are respectively formed in the display region and the peripheral region by double-sided laser etching. Therefore, compared with the conventional GFF structure, the touch panel disclosed in the present disclosure includes one less optical clear adhesive (OCA) layer and one substrate, so that the cost can be saved. In addition, the present disclosure effectively utilizes laser etching to clean the trace patterns in the peripheral region on the thin-film substrate, so as to form the traces without short circuits. At the same time, the present disclosure has excellent laser control technology to form shallow trenches on the thin-film substrate. Even if the thin-film substrate absorbs energy, the relationship between the depth of the grooves and the thickness of the thin-film substrate is controlled to ensure that the mechanical structure of the film substrate is not affected. The depth control technology of the present disclosure depends on the fact that the laser process of the present disclosure can effectively control the mathematical relationship between the depth of the grooves and the thickness of the thin-film substrate (that is, $D<\frac{1}{2}T$ hereinafter) to ensure that the thin-film substrate retains sufficient mechanical structure. Moreover, the present disclosure teaches the technical idea of adjusting the depth of the grooves according to the thickness of the thin-film substrate, which provides a breakthrough in mass production of ultra-thin double-sided fast laser manufacturing process.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A touch panel, comprising:
   a thin-film substrate having a display region and a peripheral region defined thereon, the thin-film substrate having a first surface and a second surface opposite to each other, and the thin-film substrate having a thickness;
   a first conductive layer disposed on the first surface and comprising a plurality of first traces disposed in the peripheral region; and
   a second conductive layer disposed on the second surface and comprising a plurality of second traces disposed in the peripheral region, wherein:
   the thin-film substrate has at least one groove at an interlaced region between one of the first traces and one of the second traces,
   a first groove of the at least one groove is in one of the first surface or the second surface and has a depth,
   the depth is between 2.5 µm and one-half of the thickness of the thin-film substrate,
   the first groove is located on the first surface,
   a first gap is formed between adjacent two of the first traces, and
   the first groove and the first gap are aligned with each other in a direction perpendicular to the first surface.

2. The touch panel of claim 1, wherein the first traces comprise a plurality of pin structures and a ground line, and the one of the first traces is the ground line.

3. The touch panel of claim 2, wherein the first groove is aligned with an edge of the ground line in the direction perpendicular to the first surface.

4. The touch panel of claim 3, wherein the first groove and the ground line are misaligned in the direction perpendicular to the first surface.

5. The touch panel of claim 1, wherein the first conductive layer further comprises a first metal layer and a first electrode layer, wherein the first electrode layer and the first metal layer are sequentially stacked on the first surface and form the first traces together in the peripheral region, the second conductive layer further comprises a second metal layer and a second electrode layer, wherein the second electrode layer and the second metal layer are sequentially stacked on the second surface and form the second traces together in the peripheral region.

6. The touch panel of claim 5, wherein the first electrode layer comprises a plurality of first-axis electrodes in the display region, and the second electrode layer comprises a plurality of second-axis electrodes in the display region.

7. The touch panel of claim 5, wherein at least one of the first electrode layer or the second electrode layer is a silver nanowire electrode layer.

8. The touch panel of claim 1, wherein a second groove of the at least one groove is located on the second surface, a second gap is formed between adjacent two of the second traces, and the second groove and the second gap are aligned with each other in a direction perpendicular to the second surface.

9. The touch panel of claim 1, wherein a second groove of the at least one groove is located on the second surface and aligned with an edge of the one of the second traces in a direction perpendicular to the second surface.

10. The touch panel of claim 1, wherein the thickness of the thin-film substrate is between 12.5 µm and 125 µm.

11. The touch panel of claim 1, further comprising a protective layer covering the first traces.

12. The touch panel of claim 11, wherein the protective layer is frame-shaped and covers a side of the first traces away from the thin-film substrate and an inner edge of the first traces.

* * * * *